LANDING BRAKE PRESSURE BYPASSED
BRAKES OFF ON CONTROL BY PEDAL

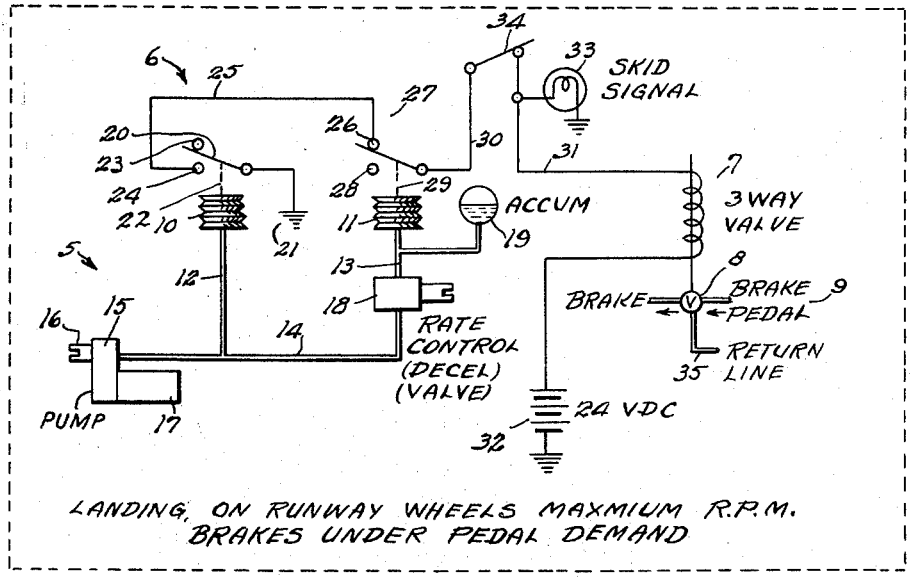
Fig. 1. LANDING ON RUNWAY WHEELS MAXIMUM R.P.M. BRAKES UNDER PEDAL DEMAND
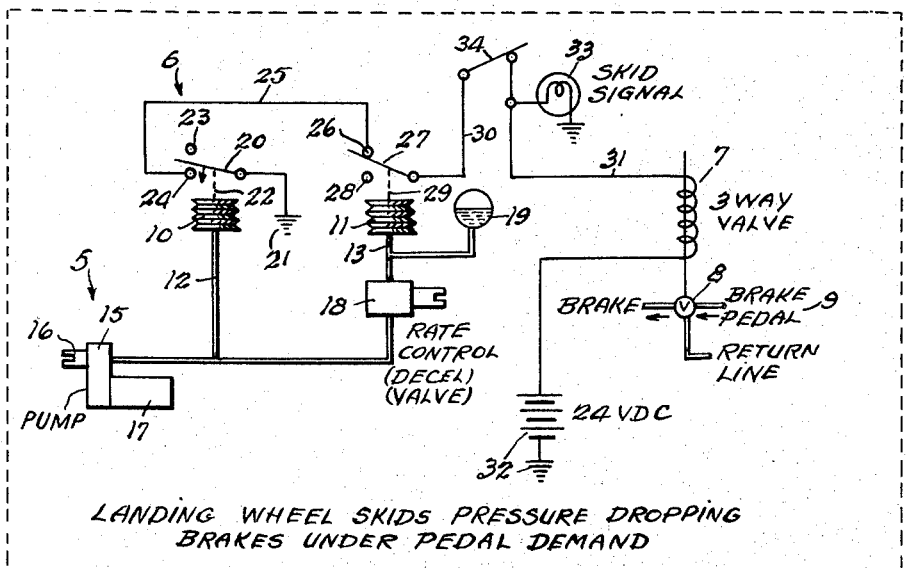
Fig. 2. LANDING WHEEL SKIDS PRESSURE DROPPING BRAKES UNDER PEDAL DEMAND

LANDING SKID CANCELED, PRESSURE RISING
BRAKES RETURNING TO PEDAL COMMAND

INVENTOR.
Richard E. Woodworth
BY.
Bertram Wm Coltman
Atty.

Aug. 2, 1960 R. E. WOODWORTH 2,947,579
ANTISKID DEVICE
Filed April 17, 1957 3 Sheets-Sheet 3
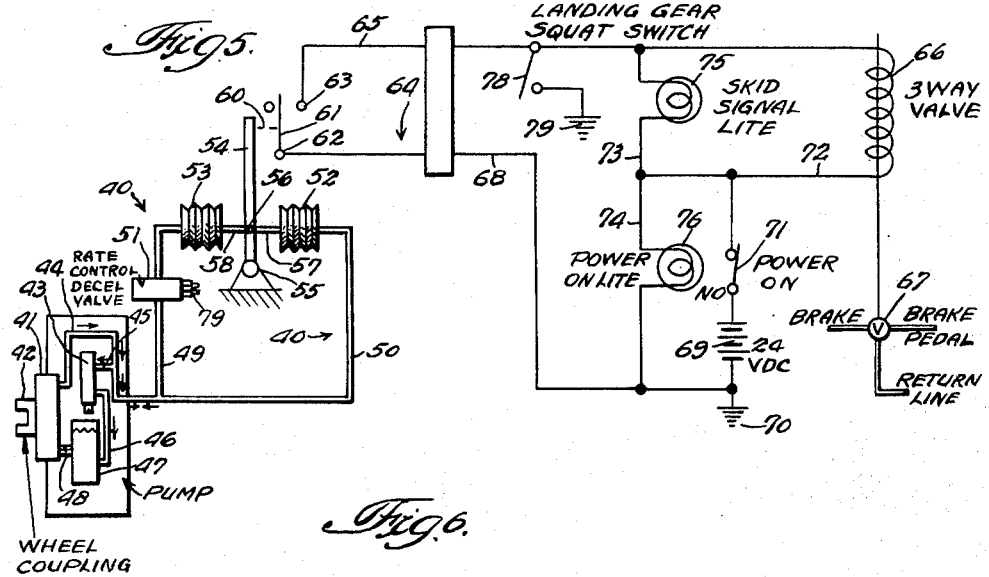
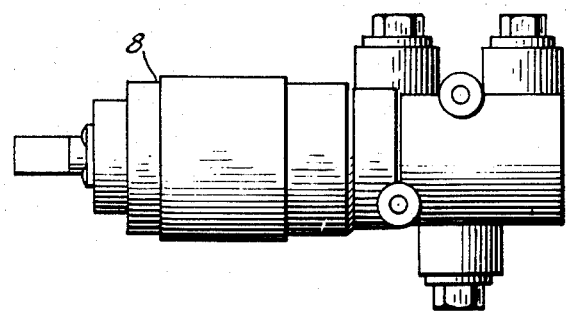
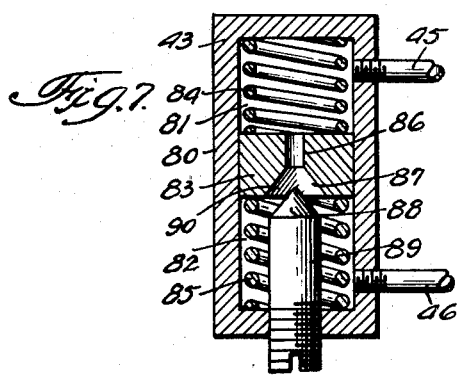
INVENTOR.
Richard E. Woodworth.
BY.
Bertram Wm Coltman.
Petty.

United States Patent Office 2,947,579
Patented Aug. 2, 1960

2,947,579

ANTISKID DEVICE

Richard E. Woodworth, Wheaton, Ill., assignor, by mesne assignments, to Cook Electric Company, Chicago, Ill., a corporation of Delaware Filed Apr. 17, 1957, Ser. No. 655,939

6 Claims. (Cl. 303—24)

This invention relates to an antiskid device in an automatic brake control mechanism and more particularly to a simple and improved form of antiskid device forming a part of the brake control mechanism, being particularly applicable to the wheels of aircraft to prevent skidding and to reapply the brake pressure when the skidding is removed.

The invention is directed broadly to an improved form of antiskid control, which is exceptionally sensitive and effective in its operation under substantially all known airplane landing conditions, and which is substantially one hundred percent reliable in its operation.

Automatic control of braking of the wheels of aircraft during landing presents a difficult problem. It is important that the wheels do not skid or lock upon landing when the braking pressure is applied. Skidding and wheel-locking have been the cause of many aircraft accidents and have compelled frequent replacement of tires, landing gears and brake mechanism. Incipient skidding should also be eliminated. Although skidding is an important problem in aircraft of the piston power type, it has become even more vital in the field of jet aircraft due to the faster landing speeds and the absence of reversible propellers. It is difficult for a pilot to bring a fast-moving airplane to a controlled stop on hazardous runways or on short runways with close landing ramps. Although antiskid devices have been heretofore proposed, they rely largely upon electrical systems that are cumbersome, occupy an excessive amount of space and are unreliable.

An object of the invention is to provide a new and improved form of antiskid device for use in braking systems of wheeled vehicles, such as aircraft or the like, adapted to operate automatically and in a manner to cause the brake mechanism to exert its greatest retarding force upon the wheels when the latter are not skidding along the ground but to effect control over the application of this retarding force and to release the same to prevent skidding and then to allow the braking pressure to be reapplied when the skidding is removed.

A further object of the invention is to provide a new and improved antiskid device of this type, which is simple to construct, and which advantageously eliminates or overcomes the difficulties encountered in an electrically controlled unit by reason of eliminating relays, vacuum tubes and frequency sensing units.

A further object of the invention is to provide a new and improved antiskid device of the character aforesaid which is more compact so as to occupy less space than antiskid devices heretofore provided. Not only is the device embodying the present invention more compact, but much lighter, which is advantageous in aircraft design due to the desirability of reducing weight whenever possible. I have found that it is possible to reduce the weight of 13.9 pounds of former devices to 3 pounds in the present structure.

A still further object of this invention is to provide in an antiskid device with these characteristics, which is not only easy to adjust, but which will maintain its adjustment, thus assuring reliability of operation and a reduction of maintenance costs.

Specifically, the invention provides mechanism for actuating the brake releasing and applying means upon slippage of a rotatable wheel, which includes a closed hydraulic circuit having therein a rotary pump driven by the rotatable wheel and opposed pressure-sensitive units, one of which is directly responsive to the pressure developed by the pump and the other which is responsive to a reduced rate of pressure, and means operated by the pressure differential to operate the brake releasing and applying means. The arrangement is extremely sensitive to deceleration caused by skidding or wheel-locking because the mechanism through the hydraulic circuit is directly responsive to the changes in the rate of rotation of the aircraft wheels and will function instantly to release the braking pressure controlled by the foot pedal upon any drop of pressure in the hydraulic circuit and will likewise function to restore the aircraft wheels to the control of the brake pedal by the pilot when the pressure in the hydraulic circuit rises.

It is also an object of the invention to provide a control valve in the hydraulic circuit to increase the sensitiveness of the pressure units by holding the pressure under normal conditions preferably at a predetermined constant so that any drop in this pressure by skidding will immediately cause operation of the three-way brake valve to release the pedal pressure at the brakes and re-establish the pedal pressure in the event the pressure is restored.

Other objects and advantages of the invention will be apparent from the following detailed description and the accompanying drawings in which:

Figure 1 is a schematic layout of one embodiment of the invention illustrating the position of the parts upon landing of the aircraft on the runway with its wheels at maximum r.p.m. and with the brake mechanism under pedal demand;

Fig. 2 is a similar view but with one or more of the landing wheels skidding and the pressure in the hydraulic circuit dropping, but with the wheels still under pedal demand;

Fig. 5 is a schematic layout of another embodiment of the invention with a condition where the brakes are under pedal demand;

Fig. 6 is a top view of the structure illustrating a compact arrangement of the parts in a housing;

Fig. 7 is an enlarged detail section of a pressure control valve.

Figure 3:
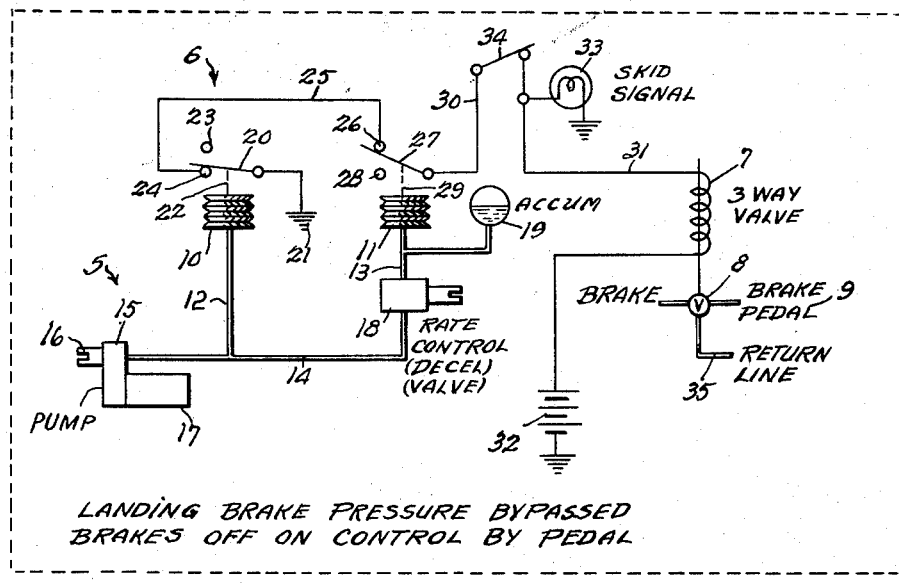
Fig. 3 is a similar view illustrating a condition where the brakes are no longer under pedal control due to the selector valve by-passing the oil to the return line at the brake pedal.

The embodiment illustrated in Figure 1 comprises a closed hydraulic circuit 5 and an electric control circuit 6 which includes a solenoid 7 of a three-way brake valve 8. The closed hydraulic circuit 5 includes a pair of expansible and contractible pressure elements 10 and 11 connected by fluid lines 12 and 13 to a fluid line 14 leading to a pump 15 of any suitable construction and preferably of a size and shape that will permit the mounting thereof in the hub of the wheel as well as a driving connection in the form of a coupling 16, which may connect with or be driven by the wheel. A suitable sump 17 may be associated with pump 15, while a rate control deceleration valve 18 may be connected in the line 13 leading from line 14 to pressure element 11. An accumulator vessel 19 may also be connected in line 13 between pressure element 11 and the rate control deceleration valve 18.

Circuit 6 preferably includes a switch 20 connected to a ground at 21 and arranged to be operated by pressure element 10 through a suitable connection 22. Switch 20 will be in open position when it engages contact 23 and in closed position when it engages contact 24. Contact 24 connects by wire 25 to a contact 26 of a second switch 27 operated by pressure element 11. A second and open contact 28 will also be engaged by switch 27 when it is allowed to move to open position by pressure element 11 through a delayed drop in pressure in line 13. Here also, any suitable connection 29 may be provided between pressure element 11 and switch 27. Solenoid 7 is connected through wires 30 and 31 to switch 27, the opposite end of the solenoid being connected to a battery 32 or other suitable source of current supply. Included in the wiring 30 and 31 is a skid signal 33 that will be energized when solenoid 7 is energized whereby to indicate to the pilot that one or more of the wheels of the landing gear are skidding and that the brakes are no longer under the control of the brake pedal. This operation will be more fully described later. Also in this circuit is a manual switch 34 disposed in the pilot's compartment for his control. If the pilot elects to retain the brakes under the control of the brake pedal, switch 34 is opened to keep solenoid 7 de-energized and to cause the three-way valve 8 to prevent the brake fluid from discharging into the return line 35.

The pressure generated by pump 15 will be the direct result of the acceleration of the wheels when the aircraft comes in for a landing and the wheels touch the runway. As the acceleration of the wheels increases, the pressure in the hydraulic circuit 5 will increase and open switch 20 by expanding pressure element 10. At this time the brakes are under pedal demand and are thus under the control of the pilot. This increase in pressure will also cause pressure element 11 to expand and close switch 27 by moving it into a position of engagement with contact 26.

Assume, however, that one or more of the wheels become locked or are skidding and there is deceleration to a point where the pressure in hydraulic circuit 5 drops and pressure element 10 begins to collapse. Switch 20 will start to move to closed position. When its contact arm engages contact 24, it will establish a flow of current that will energize solenoid coil 7. Immediately, the three-way valve 8 operates to discharge the brake fluid back into the return line 35 and thus releases the braking power through the pedals to the wheel or wheels that are skidding. This release of braking power causes the skidding wheel or wheels again to rotate. As acceleration takes place, the pressure in lines 12 and 14 is again restored and causes expansible element 10 to open switch 20 and de-energize solenoid 7 and so reverses the position of three-way valve 8 as to close the return line 35 and place the brake under the control of brake pedal 9. Pressure element 10 may be made extremely sensitive to pressure variations in hydraulic circuit 5 and immediately sense initial acceleration of the wheel after a skid so as to restore the braking pressure immediately to the brake pedal 9.

A drop in pressure in the hydraulic circuit 5 resulting from a skid of a wheel or deceleration thereof will not be as quickly reflected in the action of pressure element 11 as it will be in pressure element 10, due to the rate control deceleration valve 18 in line 13. Valve 18 may be so designed as to controllably meter the return of the fluid therethrough to pipe 14 and thus prevent any sudden drop of pressure due to the deceleration or skidding from influencing pressure element 11. Switch 27 also serves the purpose of readily restoring the control of the brakes to the brake pedal during taxiing of the aircraft to its parking position on the ramp or to any location on the field as a matter of fact, when it is very desirable to have the aircraft under full control of the pilot. Usually during this period of movement of the aircraft, the speed is in the neighborhood of ten miles per hour or so. Pump 15 will not create sufficient pressure in the hydraulic circuit 5 to expand pressure element 11 to the point of closing switch 27. Switch 20 may or may not be closed, but this is not material as long as switch 27 will remain open.

Fig. 2 illustrates the condition when one or more of the landing wheels begin to skid and the pressure in hydraulic circuit 5 begins to drop but with the brakes still under control of the brake pedal 9. Switch 20 is moving to close position, but due to the rate of pressure drop for pressure element 11 being slower due to being under the control of rate control valve 18, the pressure in line 13 will not immediately drop, and hence, switch 27 will remain closed. Fig. 3 illustrates, however, a condition where the pressure in line 12 has sufficiently dropped, due to continued skidding, to close switch 20 and the circuit of solenoid 7 of the three-way brake valve 8. This immediately will remove control of the brakes from brake pedal 9. The wheel will be relieved of brake pressure and will thus be released to recover traction with the runway. The wheel will undergo acceleration until placed in another skid, if this condition should again arise, when the pressure in hydraulic system 5 will again drop to cause pressure element 10 to close switch 20 and operate solenoid 7 to remove control of the brakes from the brake pedal 9.

It will be apparent that pump 15 driven by the wheel will operate to cause the pressure in hydraulic circuit 5 to react instantly to a skidding condition and relieve the wheel thus in a skid from further brake pressure. The wheel will no longer remain locked but will again be restored to traction so that it will immediately be placed under the control of the brake pedal 9. The fluctuations of pressure in circuit 5 operate instantly with a change in the operating conditions of the wheel that drives pump 15 and serves to act accurately in causing the closing or opening of the brake pedal relay 7. During these fluctuations, switch 27 will remain closed, as shown in Figs. 2 and 3, because valve 18 will effectively prevent a sudden drop in pressure in line 13 and pressure element 11 during the period of time involved that will be sufficient to open this switch 27.

Figure 4:
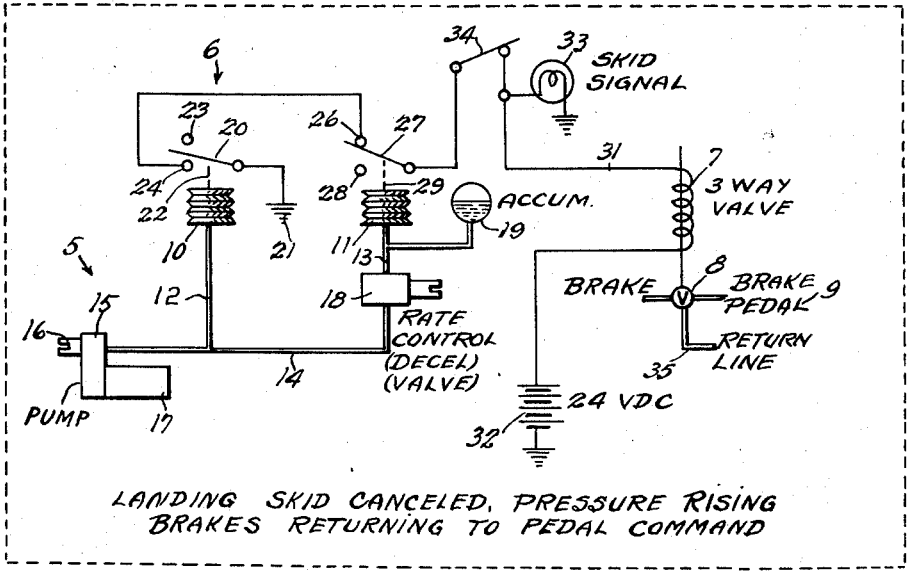
Fig. 4 illustrates a condition where skidding has been cancelled and the pressure is rising to restore the brakes to pedal demand.

Fig. 4 illustrates conditions upon landing of the aircraft but where the skid has been cancelled and pressure element 10 is opening switch 20 and de-energizing the three-way brake pedal valve 8 to restore the control of the brake to the brake pedal 9. During periods of parking or of standing idle upon the ramp, the wheels of the aircraft should preferably remain under the control of the brake pedal 9. With an idle condition, that is, where there is neither acceleration or deceleration of the wheels, pressure will not exist in hydraulic circuit 5, and consequently, although switch 20 will be closed, switch 27 will remain open and cause solenoid 7 of the three-way pedal brake valve 8 to remain de-energized and keep the wheel brakes under the control of the brake pedal.

Another embodiment of the invention is shown in Figs. 5 to 7, inclusive, wherein a hydraulic system or circuit 40 is illustrated with a pump 41 and its wheel coupling 42 associated with a pressure control valve 43, the latter being connected by lines 44 and 45 to pump 41 and to a fluid reservoir 47 by return line 46. Fluid reservoir 47 is connected by a line 48 to pump 41. Line 44 connects also to lines 49 and 50. An expansible and contractible pressure element 52 is connected at the end of line 50 and is responsive to the pressure in this line. A similar expansible and contractible pressure element 53 is connected to the end of line 49, which is provided with a rate control deceleration valve 51 similar to valve 18 so that a quick or sudden drop in pressure in circuit 40 caused by a skidding of the wheel driving pump 41 will not immediately influence pressure element 53. Both pressure elements 52 and 53 are connected to an actuator arm 54 diagrammatically illustrated as pivoted at 55 and as pivotally connected at 56 to links 57 and 58 extending from pressure elements 52 and 53. When the pressures in elements 52 and 53 equalize, switch arm 54 will be in a vertical position, but with the pressure in element 52 dropping caused by deceleration of pump 41 as the result of the wheel skidding, the pressure in element 53 will move actuator 54 to the right. Actuator 54 is connected at 60 to switch arm 61 pivoted at 62 and adapted to engage contact 63 connected in a control circuit designated broadly as 64.

Control circuit 64 includes wiring 65 leading to one end of solenoid winding 66 of the three-way brake pedal valve 67 controlling the flow of the brake fluid between the brake pedal and the braking mechanism or the release of the fluid to the return line when it is desired to remove control of the brakes from the brake pedal in the pilot's compartment. Also included in circuit 64 is wiring 68 which is connected to ground at 70. A source of power 69 has one side also grounded at 70 while the other side is connected through a power switch 71 to wiring 72, which is connected to the other end of solenoid winding 66. Wiring 72 also connects to wiring 73 and 74 that connects between wiring 65 and 68.

Inserted in wiring 73 is a skid signal light 75. A power light 76 is inserted in wiring 74. When the pressure drops in pressure element 52 as the result of the wheel skidding, the current will flow from source 69 through power switch 71, wiring 72 and 73, skid signal light 75, wiring 65, switch 61 in closed position and return through wiring 68. When switch 61 so closes, the current will also flow from the source 69 through wiring 72 and the winding 66 of the three-way brake pedal valve 67, wiring 65, switch 61, and return by way of wiring 68. The power-on light 76 apprises the pilot as to whether the power switch 71 is closed because when switch 71 is closed, the current will also flow through the power-on light 76. The usual landing gear squat switch 78 may be connected to wiring 65 and grounded at 79, as shown. The squat switch 78 is operated by the landing gear. Prior to landing, the squat switch 78 is in a closed position and remains closed until the landing gear is supporting a portion of the weight of the aircraft. The solenoid 66 is operated when the squat switch 78 is closed causing valve 67 to close thus preventing the brake fluid from passing to the brake mechanism until the aircraft is firmly on the ground.

In the operation of the structure shown in Fig. 5, skidding of the wheel, that drives pump 41, drops the pressure in the hydraulic line 50, and, of course, the line 49 as far as the valve 51. Inasmuch as valve 51 prevents as rapid a drop in pressure in pressure element 53, the pressure of the latter will at this time exceed the pressure of element 52 and cause element 53 to expand and move actuator arm 54 to the right. Switch 61 will then be closed to energize solenoid winding 66 to close valve 67 and by-pass the braking fluid to the return line of the brake mechanism. Immediately, skidding wheel is relieved of the brake pressure applied through the brake pedal and is permitted to regain its traction with the runway. As the wheel accelerates, the pump 41 will restore the pressure in line 50 until it causes pressure element 52 to overcome the pressure of element 53 and open switch 61 so as to restore the control of the brake mechanism to the action of the brake pedal. During the cycle of operation prior to the time when pump 41 is restoring the pressure in line 50, the pressure in element 53 is gradually dropping due to the metering action by valve 51. Consequently, when the pressure in line 50 reaches the point where the accelerating wheel should be restored to the control of the brake pedal, the original pressure in element 53 has dropped so that element 52 will be permitted rapidly to respond to a predetermined restored pressure in line 50. Switch 61 is in effect operated by a difference in pressure between pressure elements 52 and 53 which may be accurately controlled within narrow limits by the manual adjustment 79 of rate control valve 51.

To maintain the pressure in the hydraulic circuit 40 within accurate and closely held limits so that a skidding wheel may be relieved of the braking pressure being applied by the brake mechanism through control by the brake pedal the instant skidding occurs and then restored again to the control of the brake pedal the instant skidding ceases, pressure control valve 43 is connected in the hydraulic line 44 in order that a portion of the fluid will be by-passed or returned to the reservoir depending upon the predetermined pressure to be maintained in lines 49 and 50. As shown in detail in Fig. 7, valve 43 may be in the form of a housing 80 divided into upper and lower chambers 81 and 82 by a piston 83 with a spring 84 in the upper chamber and a spring 85 in the lower chamber. The fluid will enter by way of line 45 into upper chamber 81 and will act against piston 83 having a central passage 86 terminating in a flared area 87. Cooperating with the flared area 87 is a tapered head 88 of adjustably carried valve pin 89, the latter preferably being threadably received in the bottom wall of housing 80 and easily adjustable by the use of a sharp end instrument or the like. By varying the effective area of the piston at the flared portion 87 through the adjustment of valve pin 89, the pressure may be varied. I have found that a satisfactory pressure to maintain in lines 49 and 50 may be in the neighborhood of 750 pounds per square inch, although other pressures may also be effectively used. The fluid will be returned to reservoir 47 by line 46 and thence supplied to pump 41 by line 48. Spring 84 will act to prevent flutter or chatter by piston 83 while spring 85 will cooperate with piston 83 to hold the predetermined pressure as set by the adjustment of pin 89. As soon as the pump 41 starts decelerating as the result of a wheel skid, the pressure will first drop in line 50. Immediately the differential in pressure between pressure elements 52 and 53 will swing actuator arm 54 to the right and close switch 61 to energize solenoid winding 66 and remove the control of the braking pressure from the brake pedal. Likewise, instant action takes place when the pump resumes acceleration. The immediate increase in pressure in element 52 will effectively cause element 52 to overcome the action of element 53 and open switch 61 so that control of the braking pressure is instantly restored to the brake pedal.

It will be apparent that an exceptionally sensitive and effective antiskid control has been provided that is substantially one hundred percent reliable under substantially all known airplane landing conditions. This antiskid control is compact, occupies less space and is much lighter than known devices of this type. It is not only easy to adjust, but is easy to maintain the adjustment when once made. This assures reliability and minimum maintenance costs.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In a braking system for wheeled vehicles, in combination with a rotatable wheel and brake mechanism for retarding said wheel, means for releasing and applying said brake mechanism, and mechanism for actuating said releasing and applying means upon excessive deceleration of said wheel and deactuating said releasing and applying means upon subsequent acceleration of said wheel including a closed hydraulic circuit having therein a rotary pump driven by said rotatable wheel, opposed pressure sensitive units, means coupled to said rotary pump to control the rate of output pressure change, means connecting one of said pressure sensitive units to respond directly to the pressure developed by said rotary pump, means connecting the other of said pressure sensitive units to said rate of output pressure change control means to cause said other pressure sensitive unit to respond to a reduced rate of change of pressure, and a control member operable by the differential movement of said opposed pressure sensitive units for operating said brake releasing and applying means.

2. In a braking system for wheeled vehicles, in combination with a rotatable wheel and brake mechanism for retarding said wheel, means for releasing and applying said brake mechanism, and mechanism for actuating said releasing and applying means upon excessive deceleration of said wheel and deactuating said releasing and applying means upon subsequent acceleration of said wheel including a closed hydraulic circuit having therein a rotary pump driven by said rotatable wheel, opposed pressure sensitive units, means coupled to said rotary pump to control the rate of output pressure change, means connecting one of said pressure sensitive units to respond directly to the pressure developed by said rotary pump, means connecting the other of said pressure sensitive units to said rate of output pressure change control means to cause said other pressure sensitive unit to respond to a reduced rate of change of pressure, a solenoid, and an electric switch operable by differential movement of said opposed pressure sensitive units to actuate said solenoid and said brake releasing and applying means.

3. In a braking system for wheeled vehicles, in combination with a rotatable wheel and brake mechanism for retarding said wheel, means for releasing and applying said brake mechanism, and mechanism for actuating said releasing and applying means upon excessive deceleration of said wheel and deactuating said releasing and applying means upon subsequent acceleration of said wheel including a closed hydraulic circuit having thereon a rotary pump driven by said rotatable wheel, opposed pressure sensitive units, means coupled to said rotary pump to control the rate of output pressure change, means connecting one of said pressure sensitive units to respond directly to the pressure developed by said rotary pump, means connecting the other of said pressure sensitive units to said rate of output pressure change control means to cause said other pressure sensitive unit to respond to a reduced rate of change of pressure, and means operated by said pressure sensitive units for operating said brake releasing and applying means.

4. In a braking system for wheeled vehicles, in combination with a rotatable wheel and brake mechanism for retarding said wheel, means for releasing and applying said brake mechanism, and mechanism for actuating said releasing and applying means upon excessive deceleration of said wheel and deactuating said releasing and applying means upon subsequent acceleration of said wheel including a closed hydraulic circuit having therein a pressure generating means, two pressure sensitive units, means coupled to said pressure generating means to control the rate of output pressure change, means connecting one of said pressure sensitive units to respond directly to the pressure developed by said pressure generating means, means connecting the other of said pressure sensitive units to said rate of output pressure change control means to cause said other pressure sensitive unit to respond to a reduced rate of change of pressure, and means operated by said pressure sensitive units for operating said brake releasing and applying means.

5. In a braking system for wheeled vehicles, in combination with a rotatable wheel and brake mechanism for retarding said wheel, means for releasing and applying said brake mechanism, and mechanism for actuating said releasing and applying means upon excessive deceleration of said wheel and deactuating said releasing and applying means upon subsequent acceleration of said wheel which includes a closed hydraulic circuit, a pressure pump in said hydraulic circuit operated by said rotatable wheel for producing a pressure in said hydraulic circuit, means in said circuit for maintaining a predetermined pressure therein when said pump is driven by said rotatable wheel, means for reducing the rate of change of pressure developed by said pump, means connecting said rate of change of pressure reducing means to said hydraulic circuit, opposed pressure sensitive units, means connecting one of said pressure sensitive units to said hydraulic circuit to respond directly to the pressure developed by said pump, means connecting the other of said pressure sensitive units to said rate of change of pressure reducing means to cause said other pressure sensitive unit to respond to a reduced rate of change of pressure, and means operated by said units for operating said brake releasing and applying means.

6. In a braking system for wheeled vehicles, in combination with a rotatable wheel and brake mechanism for retarding said wheel, means for releasing and applying said brake mechanism, and mechanism for actuating said releasing and applying means upon excessive deceleration of said wheel and deactuating said releasing and applying means upon subsequent acceleration of said wheel which includes a hydraulic circuit, a pump for producing a pressure in said hydraulic circuit, the operation of said pump being controlled by the operation of said rotatable wheel, means for reducing the rate of change of pressure developed by said pump, means connecting said rate of change of pressure reducing means to said hydraulic circuit, opposed pressure sensitive units, means connecting one of said pressure sensitive units to said hydraulic circuit to respond directly to the pressure developed by said pump, means connecting the other of said pressure sensitive units to said rate of change of pressure reducing means to cause said other pressure sensitive unit to respond to a reduced rate of change of pressure, and means operated by said units for operating said brake releasing and applying means, means in said hydraulic circuit for maintaining a predetermined pressure therein when said pump is driven by said rotatable wheel, electric switch means actuated by differential movement of said opposed pressure sensitive units, and means operated by said electric switch means for operating said brake mechanism.

References Cited in the file of this patent

UNITED STATES PATENTS

| 2,039,701 | Bush | May 5, 1936 |
| 2,208,737 | Stewart | July 23, 1940 |
| 2,321,059 | Anderson | June 8, 1943 |
| 2,799,462 | Steigerwald | July 16, 1957 |

FOREIGN PATENTS

| 874,639 | France | May 18, 1942 |
| 290,713 | Great Britain | May 15, 1928 |